United States Patent

Heinz et al.

Patent Number: 5,582,429
Date of Patent: Dec. 10, 1996

[54] COLLISION PROTECTION DEVICE FOR THE OCCUPANTS OF A MOTOR VEHICLE

[75] Inventors: Martin Heinz, Stuttgart; Norbert Schwan, Leonberg; Michael Gumprecht, Schellerten, all of Germany

[73] Assignees: Dr. Ing. h.c. F. Porsche Aktiengesellschaft, Stuttgart-Zuffenhausen; Phoenix Airbag GmbH, Hildesheim, both of Germany

[21] Appl. No.: 355,088

[22] Filed: Dec. 12, 1994

[30] Foreign Application Priority Data

Dec. 18, 1993 [DE] Germany ............... 43 43 331.6
Jan. 8, 1994 [DE] Germany ............... 44 00 380.3

[51] Int. Cl.$^6$ ............... B60R 21/16; B60R 21/05; B60R 21/20; B60R 21/26
[52] U.S. Cl. ............................................. 280/743.2
[58] Field of Search ....................................... 280/743.2

[56] References Cited

U.S. PATENT DOCUMENTS 5,186,489  2/1993  Imai ........................ 280/743.2

FOREIGN PATENT DOCUMENTS

| 03148673A | 5/1988 | European Pat. Off. . |
| 496566 | 1/1992 | European Pat. Off. . |
| 0611683A1 | 9/1993 | European Pat. Off. . |
| 4033835 | 4/1991 | Germany . |
| 91 02 740.3 | 8/1991 | Germany . |
| 4240227 | 6/1993 | Germany . |
| 4243645 | 8/1992 | Japan . |
| 5-301533 | 11/1993 | Japan ................ 280/743.2 |
| 2252083 | 1/1991 | United Kingdom . |
| 94/06652 | 3/1994 | WIPO ................ 280/743.2 |

*Primary Examiner*—Kenneth R. Rice
*Attorney, Agent, or Firm*—Collard & Roe, P.C.

[57] ABSTRACT

A collision protection device for the occupants of a motor vehicle having a fabric air bag having a top part, a bottom part and a plurality of catch belts arranged within the air bag. The catch belts are formed by the fabric segments of the reinforcing parts mounted on the inside of the top and bottom parts of the bag. The fabric segments being set in the direction of the interior space of the air bag and are sewn together in an overlapping configuration in the center zone to form a joint between the top and bottom parts of the air bag. Each of the catch belts is at least double-layered and extends into the interior space between the top and bottom parts of the air bag, each of the layers being connected with each other in the joint formed at the center zone.

3 Claims, 1 Drawing Sheet

5,582,429

COLLISION PROTECTION DEVICE FOR THE OCCUPANTS OF A MOTOR VEHICLE

BACKGROUND OF THE INVENTION

1. Field of the Invention

The present invention relates to a collision protection device for the occupants of a motor vehicle. More particularly, it relates to the catch belt formation and configuration within a fabric air bag.

2. The Prior Art

A collision protection device of such a type is known from DE-A-42 40 227 (FIG. 3). In connection with the latter, two or more catch belts are needed depending on the required shape of the air bag. For predetermined design reasons, however, it is not possible to assure sufficient strength in the catch belt when it is stressed.

SUMMARY OF THE INVENTION

The present invention provides an extremely flat air bag design by means of highly stressed catch belt constructions.

According to the invention, double-layered catch belts are provided. The double-layered catch belts extend between the top part and the bottom part of the air bag and are connected with each other in a joint at the center zone of the interior space of the air bag. In the preferred embodiment of the invention, two reinforcing parts are mounted on each of the top and bottom parts of the air bag. Each of the reinforcing parts of the top part have fabric segment ends extending in the direction of the interior space of the air bag. Each of the reinforcing parts of the bottom part have fabric segment ends extending in the direction of the interior space of the air bag and opposing the fabric segment ends of the top part. The opposing fabric segment ends of the top and bottom parts are connected to each other in a common, overlapping joint. The preferred means for connecting the fabric segment ends is by sewing. The connection of the fabric segment ends define the catch belts of the invention.

Within the center zone of the common joint, there are several possibilities for overlapping the individual fabric segment ends. In the first embodiment of the invention, the fabric segment ends extending from the top part rest against an opposing fabric segment end extending from the bottom part, thereby providing an alternating overlapping arrangement of the fabric segment ends in the common joint.

In the second embodiment of the invention, the fabric segment ends are arranged in the common joint such that only one of the fabric segment ends extending from the top part rests against a fabric segment end extending from the bottom part.

It is an object of the present invention to provide a catch belt construction for a fabric air bag that overcomes the shortfalls of the prior art.

It is yet another object of the invention to provide a catch belt construction for a fabric air bag that has a double-layered design.

Another object of the invention is to provide a catch belt construction for a fabric air bag that allows an extremely flat air bag design.

Yet another object of the invention is to provide a catch belt construction for a fabric air bag that utilizes two reinforcing parts having opposing fabric segment ends on the top and bottom parts of the air bag.

Another object of the invention is to provide a catch belt construction for fabric air bags that operates effectively and reliably.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
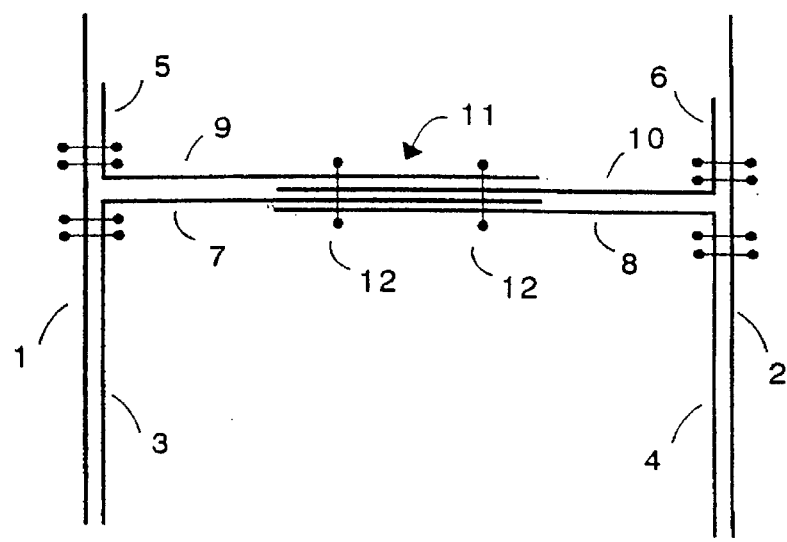
FIG. 1 is a schematic diagram of the double-layered catch belt construction according to the first embodiment of the invention.

Turning now in detail to the drawings, FIG. 1 shows two reinforcing parts 3 and 5 mounted on the top part 1 of the air bag in opposite directions. The reinforcing parts 4 and 6 of bottom part 2 are mounted in the same opposite direction configuration. In each case, reinforcing parts 3 and 5 have fabric segment ends 7 and 9, respectively, and reinforcing parts 4 and 6 have fabric segment ends 8 and 10, respectively. Fabric segment ends 7, 8, 9, and 10 extend from their respective part toward the interior space of the air bag and are arranged in the common joint 11 at the center zone of the interior space of the air bag, such that a fabric segment end 7 or 9 extending from the top part 1 comes to rest against a fabric segment end 8 or 10 extending from the bottom part, respectively. Thus, the fabric segment ends are arranged in an alternating overlap configuration. The fabric segment ends are sewn together by connection seams 12 at common joint 11.

Figure 2:
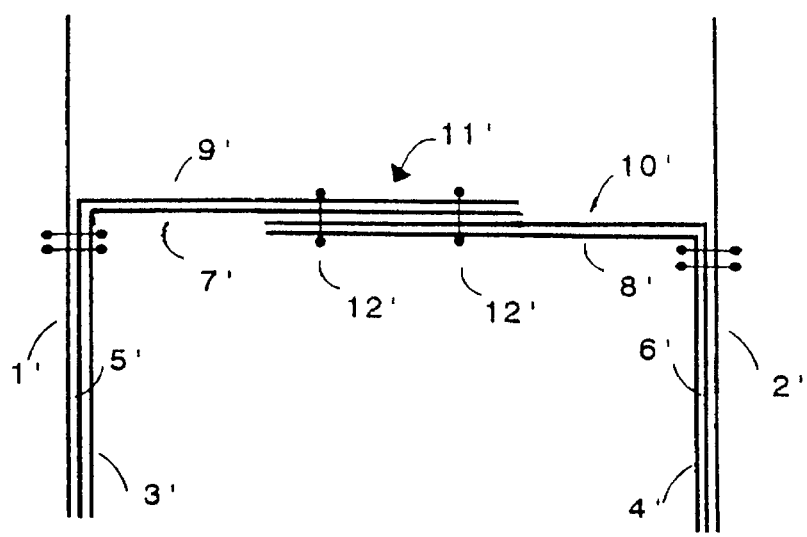
FIG. 2 is a schematic diagram of the double-layered catch belt construction according to the second embodiment of the invention.

According to FIG. 2, the two reinforcing parts 3' and 5' are mounted on the top part 1 and reinforcing parts 4' and 6' are mounted on the bottom part 2' as a double layer in one direction The fabric end segments 7', 9' and 8', 10' from the reinforcing parts 3', 5' and 4', 6' respectively, are arranged in the common joint 11' in a way such that only one fabric segment 7' extending from the top part 1' comes to rest against one fabric segment end 10' extending from the bottom part 2'. As shown, the fabric segment ends are sewn together by connection seams 12' at common joint 11'. In this embodiment, the reinforcing parts 3', 5' and 4', 6' can be connected with the top and bottom parts, respectively, according to the principle shown in FIG. 1. (i.e., in opposite directions).

It is essential to the invention that the layers of fabric segment ends forming the catch belts are connected with each other at least in the common joint 11 and 11'.

In both embodiments of the invention, the reinforcing parts 3, 3' and 5, 5' of top part 1, 1', respectively, and 4, 4' and 6, 6' of bottom part 2, 2', respectively, act for the air bag as a protection against fire.

While two embodiments of the present invention have been shown and described, it is to be understood that many changes and modifications may be made thereunto without departing from the spirit and scope of the invention as defined in the appended claims.

What is claimed is:

1. A device for protecting the occupants of a motor vehicle during collision comprising:

a fabric air bag having a top part, a bottom part, an an inside surface, and an interior space having a center zone between said top and bottom parts;

two top reinforcing parts mounted on the inside surface of said top part, said top reinforcing parts having fabric segment ends extending therefrom in the direction of the interior space of said bag;

two bottom reinforcing parts mounted on the inside surface of said bottom part, said bottom reinforcing parts having fabric segment ends extending therefrom in the direction of the interior space and opposing said fabric segment ends extending from said top reinforcing parts; and said fabric segment ends from said top and bottom reinforcing parts overlapping each other and being sewn together at said center zone to form a common joint, whereby the sewn together fabric segment ends at the common joint define a double-layered catch belt connecting said top part with said bottom part.

2. The device according to claim 1, wherein each of said two reinforcing parts on said top and bottom parts are mounted in opposite directions with respect to each other and whereby the fabric segment ends of said reinforcing parts are arranged at the common joint such that each fabric segment end extending from said top part rests against a fabric segment end extending from said bottom part.

3. The device according to claim 1, wherein said two reinforcing parts on said top and bottom parts are mounted as double layers in one direction, and whereby each of the fabric segment ends of the reinforcing parts are arranged in the common joint such that only one of said fabric segment ends extending from said top part rests against a fabric segment end extending from said bottom part.

* * * * *